Figure 1:
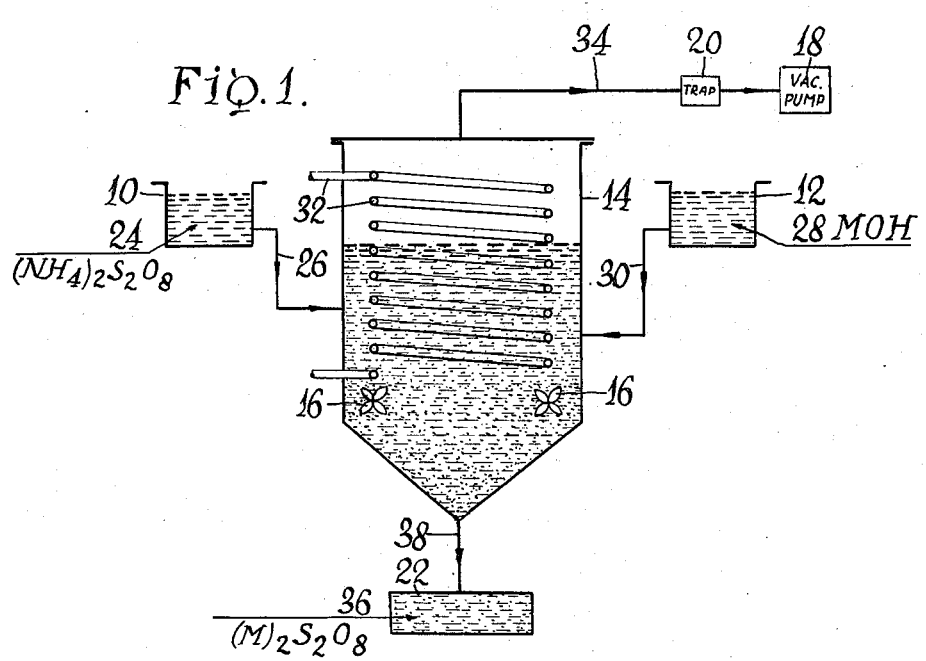

Aug. 11, 1959 — D. O. FLACH ET AL — 2,899,272
PRODUCTION OF PERSULFATES
Filed Nov. 4, 1957

INVENTORS
Donald O. Flach,
Reed E. Garver,
BY Bean, Brooks, Buckley & Bean
ATTORNEYS.

United States Patent Office 2,899,272
Patented Aug. 11, 1959

2,899,272
PRODUCTION OF PERSULFATES

Donald O. Flach, Williamsville, and Reed E. Garver, Snyder, N.Y., assignors to Food Machinery and Chemical Corporation, San Jose, Calif.

Application November 4, 1957, Serial No. 694,336

7 Claims. (Cl. 23—114)

This invention relates to the production of salts of persulfuric acid, and particularly to the production of certain alkali metal and alkaline earth metal salts of persulfuric acid.

The ammonium salt of persulfuric acid is readily available commercially, being an intermediate in the electrolytic production of hydrogen peroxide from ammonium sulfate. This persulfate has been found useful in applications requiring a material having certain oxidation characteristics, and in which the ammonium ion can be tolerated.

However, in certain applications it is desired to employ persulfates having cations other than the ammonium ion, and likewise having differing solubilities from those of the ammonium persulfate. Thus, for example, whereas ammonium persulfate is well suited to use in metal treatments, potassium persulfate has been found particularly useful as a catalyst in the synthesis of synthetic rubbers. The other salts of persulfuric acid likewise have specific properties, including varying degrees of solubility and varying oxidation powers, which adapt them to particular applications.

It is known to produce persulfates by the reaction of ammonium persulfate with certain hydroxides, or with the corresponding carbonates which react in aqueous solution as hydroxides. In this connection the reaction of guanidine carbonate with ammonium persulfate to form guanidine persulfate is described in U.S. Patent No. 2,262,723. According to the teachings of this patent, guanidine carbonate in aqueous solution is reacted with ammonium persulfate to form guanidine persulfate, following which the resulting solution is evaporated at room temperature and reduced pressure to dehydrate the solution and remove ammonia and carbon dioxide formed in the reaction.

It is noted in this patent, however, that about 35% of the guanidine persulfate produced according to this process decomposes to guanidine sulfate, with loss of the corresponding amount of active oxygen. Whereas in the case of guanidine persulfate the sulfate product is useful in admixture with the persulfate, in production of other persulfates by a similar reaction mechanism, loss of active oxygen cannot be tolerated. Furthermore, decomposition of the active oxygen compounds and resulting generation of free oxygen is highly dangerous. The oxygen liberated forms highly explosive mixtures with ammonia which is a by-product of the main reaction. For these reasons the prior art method has not met with acceptance in the production of persulfates.

It is a feature of this invention to provide a method of producing pure, solid persulfates from ammonium persulfate.

It is a further feature of this invention to provide a method of producing such persulfates from ammonium persulfate wherein the products are freed of by-product ammonium ion without substantial loss of active oxygen or danger of explosion.

It has been found that by reacting ammonium persulfate with a suitable hydroxide, the cation of which it is desired to substitute for the ammonium ion in the ammonium persulfate, at certain reduced pressures and at certain specified temperatures, it is possible to produce a desired persulfate in substantially 100% purity and with losses of up to less than 1% of active oxygen from the persulfate radical.

In accordance with this process, the ammonium persulfate and the hydroxide are mixed and reacted at a temperature of about 0° to 45° C., and at a pressure of 5 to 90 mm. of mercury, absolute. It has been found that by carrying out the reaction under these conditions it is possible essentially to eliminate decomposition of persulfate into oxygen and sulfate, and further to eliminate formation of explosive mixtures, while permitting crystallization from the reaction mixture of the desired persulfate.

Operation at the particular pressures employed causes dissipation of the heat of reaction by evaporation of water, ammonia and any oxygen formed, thereby avoiding substantial decomposition of persulfate. Furthermore, operation at the herein pressures and temperatures causes water vapor to be formed along with ammonia vapor and any oxygen which might be produced. This formation of water vapor creates a desirable environment for ammonia vapor and any oxygen which may be formed, further reducing the probability of formation of dry, explosive ammonia-oxygen mixtures.

The process has been found particularly suited to operation with hydroxides of alkali metal or alkaline earth metals from the group consisting of sodium, potassium, barium, lithium, strontium, rubidium, and cesium. However, the metals may be replaced with other cations whose hydroxides are strong enough to replace ammonium ion from the ammonium persulfate. Suitable alternate cations include for example the organic quaternary ammonium radical, and various amines.

The hydroxide may be employed as such, or may be formed in situ in the reaction mixture by hydrolysis of the corresponding carbonate, the only requirement for use of the carbonate being that it must be water soluble. Reference herein to the hydroxide therefore shall be generic to both the hydroxides and those carbonates of the indicated metals which are water soluble to the extent of at least about 5 grams per 100 ml. of water at room temperature. When the carbonate is employed, the carbon dioxide formed during reaction is removed along with water and ammonia vapors, and serves as a further diluent for the vapor system, thereby assisting in the reduction of any explosion hazard.

The present reaction may be represented by the following general equations:

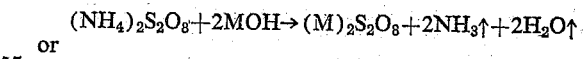

or

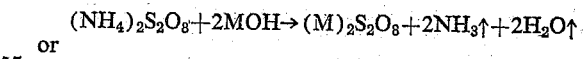

where M is one of the metals referred to above.

The present process is particularly suited to continuous operation. Following the initial mixing and reacting of ammonium persulfate and hydroxide at the pressures and temperatures stated above, and consequent formation of a body of reaction mixture, addition of further ammonium persulfate and hydroxide to the reaction mixture can be effected readily and with little danger of overheating and decomposition of persulfate. The ammonium persulfate and the hydroxide are introduced at separate points in the body of reaction mixture, which is undergoing agitation. This causes the added materials to disperse throughout the reaction mixture, so that they react in small amounts at diverse points in the mixture, and therefore in easily controlled fashion.

The temperature at which the present reaction is conducted is between 0° and 45° C. It is important that the reaction be run at a temperature no higher than about 45° C., in order to avoid undue decomposition of persulfate, and it is important further that the reaction mixture be agitated vigorously to avoid creation of local hot spots in the reaction mixture.

The reaction and the crystallization of product are conducted at a reduced pressure, namely at about 5 to 90 mm. of mercury, absolute. Operation at these pressures causes immediate evaporation of ammonia and water formed during the reaction, and this evaporation maintains the temperature of the reaction mixture at a low level. It normally is necessary to supply heat to the system, in order that the water and ammonia will be evaporated completely. About 1100 B.t.u.'s must be supplied to the system for each pound of water and ammonia to be removed as vapor, and while most of the heat energy required is generated by the exothermal reaction between the ammonium persulfate and the hydroxide, the balance must be made up by external heating means, for example by means of a heater attached to the reaction vessel or by means of heaters immersed in the reaction mixture.

The reaction is conducted in aqueous medium, with the hydroxide and ammonium persulfate solutions being mixed in substantially saturated form. It is preferred to introduce the reaction ingredients as saturated aqueous solution for the reason that addition of less than substantially saturated solutions introduces excessive amounts of water which must be removed from the reaction product during crystallization. However, it is possible to operate with less than substantially saturated aqueous solutions of the reaction ingredients, provided care is taken to insure complete removal of water during crystallization.

The reaction between the ammonium persulfate and the desired hydroxide takes place substantially on contact. Operation of the present process therefore is limited timewise largely by the time required to establish contact between these ingredients, and to crystallize out the desired product and remove by-products from it. Completion of the process is readily observable, and is signified by cessation of ammonia and water vapor evolution, and by the production of product crystals from which free water has substantially been removed.

Following initial mixing of the reactants, the reaction is permitted to proceed to a point where the ammonium ion content, expressed as ammonium sulfate, is no greater than about 60 grams per liter of solution. When this has been achieved, a reaction medium has been provided which contains a mother liquor of the persulfate product desired, and water, along with some ammonia. In addition to this, a certain amount of the product crystallizes by reason of evaporation of ammonia and water, and is present as a solid. It has been found that when the ratio of liquid reaction mixture is greater than about 20:1 in proportion to the amounts of reaction ingredients which are added to the mixture and are present therein in unreacted form, and the ammonium ion content has been reduced below the indicated level of 60 grams/liter, the reaction ingredients can be added to the reaction mixture without undue loss of persulfate even if the pressure in the system is permitted to exceed 90 mm. Hg. If the pressure is permitted to rise above 90 mm. Hg, however, the rate of addition of ammonium persulfate should not be great enough to permit the ammonium content of the system to exceed the noted 60 grams per liter calculated as ammonium sulfate.

The reaction preferably is conducted in an alkaline medium, although it can be conducted at a pH as low as about 4.5. It is preferred to operate in an alkaline medium for the reason that removal of ammonia from the system during crystallization becomes increasingly difficult as the reaction mixture becomes more acid.

The invention will now be described more particularly with reference to the attached drawings. In the drawings, Figure 1 represents an apparatus for use in carrying out the present reaction and crystallization by a batch process; and, Figure 2 represents apparatus employed in carrying out the reaction continuously.

Figure 2:
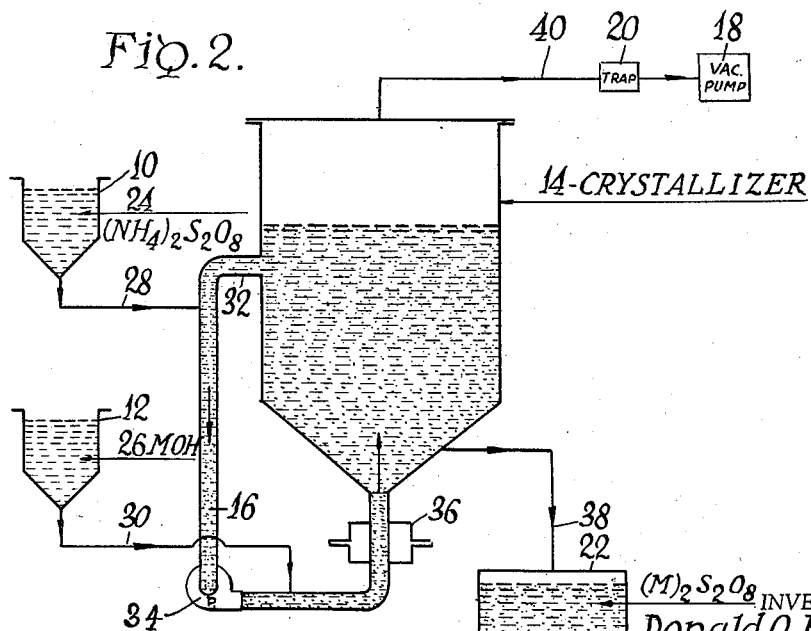

In Figure 1, 10 represents a supply and storage tank for ammonium persulfate solution, 12 represents a similar tank for the hydroxide solution, 14 is a vacuum crystallizer, in which agitators 16 are provided, 18 represents a vacuum source, and 20 a vapor trap. In this drawing 22 represents a tank into which the persulfate product crystals are discharged.

In operation of the process according to the batch procedure, ammonium persulfate 24 is introduced into the crystallizer 14 through feed line 26, and the desired hydroxide 28 is added to it slowly through feed line 30 until a substantially stoichiometric amount of the hydroxide has been introduced. During this addition of hydroxide 28 the resulting mixture is agitated by means of agitators 16. The crystallizer 14 is maintained during this addition and during the subsequent reaction and crystallization at a temperature of 0° to 45° C. and at a pressure of about 5-90 mm. of mercury, absolute. The temperature is maintained by means of heat exchanger 32 disposed within the crystallizer 14.

During the course of the reaction ammonia and water vapors are evacuated through line 34 into vacuum trap 20, to provide for crystallization of persulfate product 36 which is removed as a slurry in reaction mixture through line 38 into receiving tank 22, where it is separated by suitable means, e.g. centrifugation, filtration, or the like from the reaction mixture which may be returned to the crystallizer.

The preferred continuous process of the present invention will be described with reference to Figure 2, in which 10 represents a storage and supply tank for ammonium persulfate solution, 12 represents a similar tank for the hydroxide solution, 14 is a vacuum crystallizer, 20 is a vapor trap, 18 is a vacuum source, and 22 is a tank into which the persulfate product crystals are discharged.

In operation of the process, ammonium persulfate 24 and sodium hydroxide 26 are mixed in substantially stoichiometric amounts in crystallizer 14, being introduced into the crystallizer from tanks 10 and 12 through feed lines 28 and 30, to form a reaction mixture. The feed is caused to enter the crystallizer 14 through circulation line 32, which is attached to crystallizer 14, the circulation line containing a pump 34 which causes the added ingredients to be mixed together and passed into the crystallizer. During addition of the ammonium persulfate and hydroxide into the crystallizer 14, the pressure in the crystallizer is maintained at 5 to 90 mm. of mercury absolute, and the temperature of the reaction mixture therein is maintained at 0 to 45° C. The temperature of the system is regulated by the pressure at which the system is operated, and partly also by means of a steam heater 36 present on the circulation line 32 of the crystallizer.

In this operation, as in operation according to the batch process described hereinabove, the crystallized persulfate product is discharged as a slurry in reaction mixture through evacuation line 38 into receiving tank 22 where it is separated from the reaction mixture, and ammonia and water vapors which are formed as byproducts of the reaction are discharged through line 40 into trap 20.

The following examples of the production of persulfates according to the continuous process described above with reference to Fig. 2 are presented as illustrative of the present process, and are not intended as limitative of the ingredients or amounts thereof, or of the reaction conditions useful herein.

Example 1

1200 liters of an aqueous ammonium persulfate solution containing 550 g./liter of the persulfate was introduced into crystallizer 14, and circulated through circulation line 32. 300 liters of an aqueous sodium hydroxide solution containing 762 g./liter of the hydroxide then was added over 5 hours to the ammonium pursulfate solution. The temperature of the reaction mixture was maintained throughout at about 15° C., and the pressure at about 7 mm. Hg. The temperature was maintained by steam fed into heater 36, and the pressure by vacuum pump 20.

Aqueous solutions containing 550 g. per liter of ammonium persulfate and 762 g. per liter of sodium hydroxide, respectively, were then fed at rates of 39.5 liters per hour and 10 liters per hour, respectively, into the crystallizer 14, through circulation line 32. A circulation rate of 800 liters per minute of reaction mixture was maintained through circulation line 32 attached to the vacuum crystallizer 14. It has been found that the circulation rate should be sufficient to circulate completely the amount of reaction mixture at a rate equal to at least 20 to 30 times the rate of addition of persulfate and hydroxide.

85 pounds per hour of water and 7.2 pounds per hour of ammonia were released during the reaction, and were evacuated into trap 20. About 50 pounds per hour of sodium persulfate solids were produced by this process. The crystalline product was removed in the form of a slurry through line 38 into tank 22, where it was centrifuged free of reaction mixture, which was returned to crystallizer 14. The crystallized product was then permitted to dry and analyzed.

The dry product was found to contain about 99.5% $Na_2S_2O_8$, and to be ammonia free. Analysis of the dried product showed that less than 1% of the active oxygen content of the persulfate added as ammonium persulfate was lost during conversion of that persulfate to sodium persulfate.

Example 2

Initial charges of 400 liters of an aqueous ammonium persulfate solution containing 550 grams per liter of the persulfate, and 500 liters of an aqueous sodium carbonate solution containing 200 grams per liter of the sodium carbonate were mixed together as described in Example 1. Following this operation, aqueous solutions containing 550 grams per liter of ammonium persulfate and 200 grams per liter of sodium hydroxide, respectively, were fed at a rate of 13 grams per liter and 17 grams per liter, respectively, into the reaction mixture again according to the procedure described in Example 1. The reaction and crystallization were then carried out as described in Example 1, and resulted in the production of sodium persulfate having a purity of 98%. The loss of active oxygen from the persulfate during this operation was less than 1%.

Example 3

Initial charges of 1200 liters of an aqueous ammonium persulfate solution containing 550 grams per liter of the persulfate, and 320 liters of an aqueous solution of potassium hydroxide containing 1000 grams per liter of the hydroxide were mixed as described in Example 1, following which 39.5 liters per hour of a solution containing 550 grams per liter of ammonium persulfate and 10.7 liters per hour of an aqueous solution containing 1000 grams per liter of potassium hydroxide were fed into the reaction mixture as described in that example. The procedure of Example 1 was followed, with the resultant production of potassium persulfate having a purity of about 99.2%, and during the reaction less than 1% of the active oxygen content in the persulfate was lost.

Example 4

Initial charges of 1200 liters of an aqueous ammonium persulfate solution containing 550 grams per liter of the persulfate, and 365 liters of an aqueous potassium carbonate solution containing 1100 grams per liter of the carbonate were mixed according to the procedure of Example 1, following which 39.5 liters per hour of an aqueous solution containing 550 grams per liter of ammonium persulfate and 12 liters per hour of an aqueous solution containing 1100 grams per liter of potassium carbonate were fed to the reaction mixture as described in that example. Following completion of the reaction and separation of the potassium persulfate product from the reaction mixture, as described in Example 1, the potassium persulfate produced was analyzed and found to have a purity of about 97.5%. The persulfate suffered an active oxygen loss during the course of this reaction of less than 1%.

Pursuant to the requirements of the patent statutes, the principle of this invention has been explained and exemplified in a manner so that it can be readily practiced by those skilled in the art, such exemplification including what is considered to represent the best embodiment of the invention. However, it should be clearly understood that, within the scope of the appended claims, the invention may be practiced by those skilled in the art, and having the benefit of this disclosure, otherwise than as specifically described and exemplified herein.

That which is claimed as patentably novel is:

1. In the production of a metal persulfate from the group consisting of the persulfates of sodium, potassium, barium, lithium, strontium, rubidium and cesium, by reaction in an aqueous solution of ammonium persulfate and a hydroxide of said metal, the improvement which comprises mixing said ammonium persulfate and said hydroxide together in substantially stoichiometric proportions, at a temperature of about 0° to 45° C. and at a pressure of about 5 to 90 mm. of mercury absolute, whereby said ammonium persulfate and said hydroxide are caused to react to form a reaction mixture containing ammonia, water and said metal persulfate, and said metal persulfate is crystallized out from said reaction mixture as a solid, and said ammonia and water are removed from the reaction mixture as vapors.

2. In the production of sodium persulfate by reaction in aqueous solution of ammonium persulfate and sodium hydroxide, the improvement which comprises mixing said ammonium persulfate and said sodium hydroxide together in substantially stoichiometric proportions, at a temperature of about 0° to 45° C. and at a pressure of about 5 to 90 mm. of mercury absolute, whereby said ammonium persulfate and said sodium hydroxide are caused to react to form a reaction mixture containing ammonia, water and sodium persulfate, and said sodium persulfate is crystallized out from said reaction mixture as a solid, and said ammonia and water are removed from the reaction mixture as vapors.

3. In the production of sodium persulfate by reaction in aqueous solution of ammonium persulfate and sodium hydroxide, the improvement which comprises mixing together ammonium persulfate and sodium carbonate in substantially stoichiometric proportions, at a temperature of about 0° to 45° C. and at a pressure of about 5 to 90 mm. of mercury absolute, whereby said ammonium persulfate is caused to react with sodium hydroxide which is formed in situ in the reaction mixture by hydrolysis of said sodium carbonate, to form a reaction mixture containing ammonia, carbon dioxide, water and said sodium persulfate, and said sodium persulfate is crystallized out from said reaction mixture as a solid, and said ammonia, carbon dioxide and water are removed from the reaction mixture as vapors.

4. In the production of potassium persulfate by reaction in an aqueous solution of ammonium persulfate and potassium hydroxide, the improvement which comprises mixing said ammonium persulfate and said potassium hydroxide together in substantially stoichiometric proportions, at a temperature of about 0° to 45° C. and at a pressure of about 5 to 90 mm. of mercury absolute, whereby said ammonium persulfate and said potassium hydroxide are caused to react to form a reaction mixture containing ammonia, water and said potassium persulfate, and said potassium persulfate is crystallized out from said reaction mixture as a solid, and said ammonia and water are removed from the reaction mixture as vapors.

5. In the production of potassium persulfate by reaction in aqueous solution of ammonium persulfate and potassium hydroxide, the improvement which comprises mixing together ammonium persulfate and potassium carbonate in substantially stoichiometric proportions, at a temperature of about 0° to 45° C. and at a pressure of about 5 to 90 mm. of mercury absolute, whereby said ammonium persulfate is caused to react with potassium hydroxide which is formed in situ in the reaction mixture by hydrolysis of said potassium carbonate, to form a reaction mixture containing ammonia, carbon dioxide, water and said potassium persulfate, and said potassium persulfate is crystallized out from said reaction mixture as a solid, and said ammonia, carbon dioxide and water are removed from the reaction mixture as vapors.

6. Method of claim 1 wherein the aqueous ammonium persulfate and metal hydroxide solutions are substantially saturated.

7. Method of continuously producing a metal persulfate from the group consisting of the persulfates of sodium, potassium, barium, lithium, strontium, rubidium, and cesium, comprising continuously maintaining in a reactor an agitated reaction mixture containing water, ammonia and said metal persulfate at a temperature of about 0 to 45° C. and at a pressure of about 5 to 90 mm. of mercury absolute, continuously feeding to said reaction mixture aqueous solutions of ammonium persulfate and the hydroxide of the metal desired in the metal persulfate, in substantially stoichiometric amounts of persulfate and hydroxide, at such a rate as will maintain in said reaction mixture an ammonium ion concentration expressed as ammonium sulfate of less than about 60 grams per liter, and continuously withdrawing from said solution metal persulfate as crystals and ammonia and water as vapors.

References Cited in the file of this patent
FOREIGN PATENTS 16,014 of 1894    Great Britain _____ July 6, 1895